United States Patent
Gohari

(10) Patent No.: US 11,574,118 B2
(45) Date of Patent: Feb. 7, 2023

(54) TEMPLATE-BASED INTELLIGENT DOCUMENT PROCESSING METHOD AND APPARATUS

(71) Applicant: KONICA MINOLTA BUSINESS SOLUTIONS U.S.A., INC., San Mateo, CA (US)

(72) Inventor: Ebrahim Emami Gohari, Foster City, CA (US)

(73) Assignee: KONICA MINOLTA BUSINESS SOLUTIONS U.S.A., INC., San Mateo, CA (US)

( * ) Notice: Subject to any disclaimer, the term of this patent is extended or adjusted under 35 U.S.C. 154(b) by 0 days.

(21) Appl. No.: 17/219,633

(22) Filed: Mar. 31, 2021

(65) Prior Publication Data
US 2022/0318492 A1  Oct. 6, 2022

(51) Int. Cl.
| | | |
|---|---|---|
| G06F 40/00 | (2020.01) | |
| G06F 40/174 | (2020.01) | |
| G06F 40/186 | (2020.01) | |
| G06N 3/08 | (2023.01) | |
| G06F 40/194 | (2020.01) | |
| G06V 30/412 | (2022.01) | |

(52) U.S. Cl.
CPC .......... G06F 40/174 (2020.01); G06F 40/186 (2020.01); G06F 40/194 (2020.01); G06N 3/08 (2013.01); G06V 30/412 (2022.01)

(58) Field of Classification Search
CPC ..... G06F 40/174; G06F 40/186; G06F 40/194
See application file for complete search history.

(56) References Cited

U.S. PATENT DOCUMENTS

| | | | |
|---|---|---|---|
| 9,934,213 B1* | 4/2018 | Dutt | G06Q 40/00 |
| 10,452,700 B1* | 10/2019 | Truong | G06F 16/258 |
| 10,482,174 B1* | 11/2019 | Goodsitt | G06N 3/08 |
| 10,546,054 B1* | 1/2020 | Foroughi | G06N 20/00 |
| 10,733,364 B1* | 8/2020 | Allison | G06F 40/106 |
| 11,087,081 B1* | 8/2021 | Srivastava | G06F 40/205 |

(Continued)

OTHER PUBLICATIONS

Appalaraju et al., "Image similarity using Deep CNN and Curriculum Learning", 2017, Amazon Development Centre (India) Pvt. Ltd., Image similarity using Deep CNN and Curriculum Learning; 9 pages.

(Continued)

*Primary Examiner* — Scott T Baderman
*Assistant Examiner* — Barbara M Level
(74) *Attorney, Agent, or Firm* — Squire Patton Boggs (US) LLP

(57) ABSTRACT

A blank template form generation method and system may employ synthetically generated blank template forms, differing from each other in one or more respects, to train a neural network to recognize relevant differences between otherwise similar forms, including types and locations of keywords and potential locations of values corresponding to the keywords. In an embodiment, filled or partly filled forms as well as blank template forms may be used later in training. Forms are input in pairs to identify differences between the two. Depending on the differences, weights of a neural network may be adjusted. After training, when a form is input into the system, whether the form is filled or blank, a blank template may be generated for future use.

20 Claims, 22 Drawing Sheets

(56) References Cited

U.S. PATENT DOCUMENTS

| | | | |
|---|---|---|---|
| 2007/0168382 A1* | 7/2007 | Tillberg | G06F 16/313 |
| | | | 707/E17.084 |
| 2009/0018990 A1* | 1/2009 | Moraleda | G06V 30/418 |
| 2017/0147552 A1* | 5/2017 | Carroll | G06V 10/44 |
| 2019/0019020 A1* | 1/2019 | Flament | G06V 30/40 |
| 2019/0340466 A1* | 11/2019 | Berseth | G06K 9/6257 |
| 2020/0125954 A1* | 4/2020 | Truong | G06F 16/35 |
| 2020/0334456 A1* | 10/2020 | Sridharan | G06V 30/248 |
| 2020/0364243 A1* | 11/2020 | Tamayo-Rios | G06F 16/2458 |
| 2021/0149931 A1* | 5/2021 | Iliadis | G06V 30/412 |
| 2021/0158093 A1* | 5/2021 | Kaynig-Fittkau | G06V 30/414 |
| 2022/0122001 A1* | 4/2022 | Choe | G06N 3/084 |
| 2022/0156300 A1* | 5/2022 | Paruchuri | G06N 3/08 |

OTHER PUBLICATIONS

Chu et al., "Change Detection of Remote Sensing Image Based on Deep Neural Networks", Advances in Intelligent Systems Research, vol. 133, 2016, 2nd International Conference on Artificial Intelligence and Industrial Engineering (AIIE2016), 10.2991/aiie-16.2016.61.

Jain et al., "VisualDiff: Document Image Verification and Change Detection", 2013, DOI 10.1109/ICDAR.2013.17; 5 pages.

\* cited by examiner

INVOICE
XYZ Corporation
1234 Main Street
New London, California 99123

XYZ Corporation

| Widget Order | | | | | | | | | | | | | |
|---|---|---|---|---|---|---|---|---|---|---|---|---|---|
| Widget ➡ | Quantity ➡ | Price ➡ | Total ➡ | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| | | | | | | | | | | | | | |
| Subtotal | | | | | | | | | | | | | ➡ |
| Sales Tax | | | | | | | | | | | | | ➡ |
| Total | | | | | | | | | | | | | ➡ |

FIG. 1C

INVOICE
XYZ Corporation
1234 Main Street
New London, California 99123

XYZ Corporation

Widget Order

| Widget | Color | Size | Quantity | Price | Amount |
|---|---|---|---|---|---|
|  |  |  |  |  |  |
|  |  |  |  |  |  |
|  |  |  |  |  |  |
|  |  |  |  |  |  |
|  |  |  |  |  |  |
|  |  |  |  |  |  |
|  |  |  |  |  |  |
| Subtotal |  |  |  |  |  |
| Sales Tax |  |  |  |  |  |
| Shipping |  |  |  |  |  |
| Total |  |  |  |  |  |

INVOICE
XYZ Corporation
1234 Main Street
New London, California 99123

XYZ Corporation

| Widget Order | | | | |
|---|---|---|---|---|
| Widget | Quantity | Price | | Total |
| | | | | |
| | | | | |
| | | | | |
| | | | | |
| | | | | |
| | | | | |
| Subtotal | | | | |
| Sales Tax | | | | |
| Total | | | | |

INVOICE
XYZ Corporation
1234 Main Street
New London, California 99123

XYZ Corporation

Widget Order

| Widget | Quantity | Price | Total |
|--------|----------|-------|-------|
|        |          |       |       |
|        |          |       |       |
|        |          |       |       |
|        |          |       |       |
|        |          |       |       |
|        |          |       |       |
|        |          |       |       |

Subtotal
Sales Tax
Total

INVOICE
XYZ Corporation
1234 Main Street
New London, California 99123

XYZ Corporation

| Widget Order | | | |
|---|---|---|---|
| Widget | Quantity | Price | Total |
| XY-1447 | 4 | 250 | 1000 |
| XK-2588 | 4 | 200 | 800 |
| XZ-4545 | 4 | 300 | 1200 |
| XP-7879 | 4 | 500 | 2000 |
| XD-9853 | 6 | 150 | 900 |
| XG-5847 | 6 | 100 | 600 |
| XY-6565 | 2 | 150 | 300 |
| XF-1358 | 8 | 125 | 1000 |
| XB-3434 | 8 | 400 | 3200 |
| Subtotal | | | 11000 |
| Sales Tax | | | 1045 |
| Total | | | 12045 |

INVOICE
XYZ Corporation
1234 Main Street
New London, California 99123

XYZ Corporation

Widget Order

| Widget | Quantity | Price | Total |
|---|---|---|---|
| XY-1447 | 4 | 250 | 1000 |
| XK-2588 | 4 | 200 | 800 |
| XZ-4545 | 4 | 300 | 1200 |
| | | | |
| | | | |
| | | | |
| | | | |
| | | | |
| | | | |
| Subtotal | | | 3000 |
| Sales Tax | | | 285 |
| Total | | | 3285 |

INVOICE
XYZ Corporation
1234 Main Street
New London, California 99123

XYZ Corporation

| Widget Order | | | |
|---|---|---|---|
| Widget | Quantity | Price | Total |
| XY-1447 | 4 | 250 | 1000 |
| XK-2588 | 4 | 200 | 800 |
| XZ-4545 | 4 | 300 | 1200 |
| XP-7879 | 4 | 500 | 2000 |
| XD-9853 | 6 | 150 | 900 |
| XG-5847 | 6 | 100 | 600 |
| XY-6565 | 2 | 150 | 300 |
| XF-1358 | 8 | 125 | 1000 |
| XB-3434 | 8 | 400 | 3200 |
| Subtotal | | | 11000 |
| Sales Tax | | | 1045 |
| Shipping | | | 500 |
| Total | | | 12545 |

FIG. 2C

INVOICE
XYZ Corporation
1234 Main Street
New London, California 99123

XYZ Corporation

Widget Order

| Widget | Quantity | Price | Total |
|---|---|---|---|
| XY-1447 | 4 | 250 | 1000 |
| XK-2588 | 4 | 200 | 800 |
| XZ-4545 | 4 | 300 | 1200 |
| XP-7879 | 4 | 500 | 2000 |
| XD-9853 | 6 | 150 | 900 |
| XG-5847 | 6 | 100 | 600 |
| | | | |
| | | | |
| | | | |
| Subtotal | | | 6500 |
| Sales Tax | | | 618 |
| Shipping | | | 300 |
| Total | | | 7418 |

INVOICE
XYZ Corporation
1234 Main Street
New London, California 99123

XYZ Corporation

Widget Order

| Widget | Color | Size | Quantity | Price | Total |
|---|---|---|---|---|---|
| XY-1447 | Blue | S | 4 | 250 | 1000 |
| XY-1447 | Black | S | 4 | 200 | 800 |
| XZ-4545 | Black | L | 4 | 300 | 1200 |
| XP-7879 | Black | L | 4 | 500 | 2000 |
| XD-9853 | Blue | M | 6 | 150 | 900 |
| XG-5847 | Yellow | XS | 6 | 100 | 600 |
| XG-5847 | Yellow | M | 2 | 150 | 300 |
| XF-1358 | Blue | S | 8 | 125 | 1000 |
| XB-3434 | Blue | XXL | 8 | 400 | 3200 |
| Subtotal | | | | | 11000 |
| Sales Tax | | | | | 1045 |
| Shipping | | | | | 500 |
| Total | | | | | 12545 |

INVOICE
XYZ Corporation
1234 Main Street
New London, California 99123

XYZ Corporation

Widget Order

| Widget | Color | Size | Quantity | Price | Total |
|---|---|---|---|---|---|
| XY-1447 | Blue | S | 4 | 250 | 1000 |
| XY-1447 | Black | S | 4 | 200 | 800 |
| XZ-4545 | Black | L | 4 | 300 | 1200 |
| XP-7879 | Black | L | 4 | 500 | 2000 |
|  |  |  |  |  |  |
|  |  |  |  |  |  |
|  |  |  |  |  |  |
|  |  |  |  |  |  |
|  |  |  |  |  |  |
| Subtotal |  |  |  |  | 5000 |
| Sales Tax |  |  |  |  | 475 |
| Shipping |  |  |  |  | 250 |
| Total |  |  |  |  | 5725 |

TEMPLATE-BASED INTELLIGENT DOCUMENT PROCESSING METHOD AND APPARATUS

FIELD OF THE INVENTION

Aspects of the present invention relate to a machine learning-based method to automatically create a blank form from multiple filled forms.

BACKGROUND OF THE INVENTION

Automated form processing often relies on the existence of blank forms (templates) to guide data extraction from the corresponding filled forms. Automatic information extraction from documents such as forms can be important to obtaining improvements in business efficiency. Traditional form processing often has required manually created templates on a blank form to guide data extraction for a particular type of form, thus significantly improving data extraction accuracy.

A template can provide locations of fixed regions of a form, hereafter referred to as "keywords," and the location of the corresponding regions to be filled in, hereafter referred to as "values". In the following discussion "template" will refer to an image, as well as to corresponding metadata, i.e. keyword and value pair locations.

A user may create a blank form for building a template manually, to enable the automated extraction of information from the corresponding filled forms. However, such a blank form for building a template is not always available, and when available, can be time-consuming. Manual creation of blank forms from a filled form can be tedious and labor-intensive, as well as time consuming. It would be desirable to automate the manual template creation process to the extent possible.

SUMMARY OF THE INVENTION

To address the foregoing and other deficiencies, aspects of the present invention provide a machine learning-based method to create a blank form from filled forms automatically.

Aspects of the invention facilitate the identification of differences between images in a training set in order to generate a blank form to be used in template based intelligent document processing.

In one aspect, a deep neural network, particularly one of a class of convolutional neural networks, may be trained to spot the differences between scanned document images.

BRIEF DESCRIPTION OF THE DRAWINGS

Aspects of the invention now will be described with reference to embodiments as illustrated in the accompanying drawings, in which:

FIGS. 1A-1H show examples of a synthetically generated blank form according to an embodiment;

FIGS. 2A-2F show examples of filled forms according to an embodiment;

DETAILED DESCRIPTION OF EMBODIMENTS

Figure 1A:

Aspects of the invention relate to a blank template form generation method and system, where the system may comprise one or more processors, one or more non-transitory memory devices, and a deep learning system which implements a deep learning model. The system may store one or more programs in the one or more non-transitory memory devices, the one or more programs containing instructions which, when executed, may perform the blank template form generation method as follows:

responsive to an input of a pair of synthetically generated forms, using the deep learning model, comparing the forms to identify differences;

using the deep learning model, responsive to identification of differences in text in the pair of synthetically generated forms, identifying text differences as keywords and values;

using the deep learning model, responsive to identification of differences in graphics in the pair of synthetically generated forms, identifying graphics differences as one or more of form appearance and table appearance; and updating weights of nodes in the deep learning model responsive to one or more of the identifying text differences and the identifying graphics differences.

In an embodiment, the synthetically generated template forms are forms that may be blank, partly filled, or filled. In an embodiment, the forms may have one or more artifacts, such as variations in geometric transformations, lossy compressions, compression noise, binarizations, scanner noise, and camera noise, that are characteristic of images.

In an embodiment, the blank template form may be generated from an input image. The generation may include values identified in the input image.

In an embodiment, generating the blank template form from the input image may comprise producing an editable form. The editable form may be one in which only fields containing values are editable.

In an embodiment, the deep learning system may comprise a neural network selected from the group consisting of convolutional neural networks, deep convolutional neural networks, and fully convolutional neural networks.

In an embodiment, a neural network is trained first on a large training set of synthetic (artificially generated) textual images. Synthetic textual images are useful because they are more easily controllable than scanned textual images, which can suffer from challenges such as variations in geometric transformations, lossy compressions, compression noise, binarizations, scanner noise, or camera noise between different blank, partly filled, or filled forms. In an embodiment, synthetic textual images may be generated using any of a plurality of known word processing software, presentation generating software, spreadsheet software, or other software of this type which may be part of an suite of such software. Ordinarily skilled artisans will appreciate what kinds of software may be used to generate the kinds of synthetic textual images discussed herein.

In an embodiment, a training sample in the training set may consist of a pair of synthetic images, which have similarities and differences. In an embodiment, the differences may be slight. Using synthetic textual images can make it easier to define the groundtruth for the training set by controlling differences between pairs of images in a training sample.

In an embodiment, input synthetic images in a training sample may be preprocessed to include different amounts of artifacts found in actual images, such as scanner noise, compression noise, different geometric transformation, and the like. In an embodiment, the neural network may be fine tuned on pairs of real document images. In an embodiment, the differences again may be slight, thus facilitating definition of the groundtruth.

In an embodiment, a neural network may be trained to align and identify differences between document images in an end-to-end approach, rather than focusing on particular portions of an image.

At inference time, at least two filled form images are required to start the template generation process. A "blank form" image then may be generated by eliminating textual differences between the pair of input images, i.e. finding locations of the keyword and values.

The just-described process for handling training samples in a training set can result in false identification of unchanged (but filled) textual regions as keywords in a template. This false identification can occur if the input filled images are filled with (partially) identical contents. In order to improve accuracy, in an embodiment any time another filled instance of such a form is presented to the system, a training sample comprising an image pair of current filled input and a most recent latest blank form (as the system has previously generated) previously generated by the system) may be processed as previously described for image pairs.

Aspects of the invention may be implemented using various types of neural networks, including convolutional neural networks (CNN), deep convolutional neural networks (DCNN), and fully convolutional neural networks (FCNN). Ordinarily skilled artisans will recognize these neural networks and their associated acronyms, and will appreciate the capabilities of these neural networks, and will appreciate that they provide better image segmentation than do other types of neural networks, including DBN and DNN as referenced above.

In an embodiment, the inventive method begins with training sets that comprise synthetic, that is, artificially generated versions of forms. Such forms, which will resemble forms that actually are in use and which the inventive system ultimately will process, may be generated using any number of word processing and/or graphics programs. There are advantages to beginning with artificially generated versions of forms. In no particular order, one advantage is that artificial generation enables a greater level of control over the format and appearance of the resulting form. Artifacts such as blurs, irregular lines, irregular shading, scanner and/or camera noise, or other aspects of lossiness, geometric transformations, binarizations, or other irregularities that can result from taking an image of an existing form.

In an embodiment, in an initial step to train the neural network, training sets of synthetically generated blank forms are input and are compared to identify differences. In one aspect, the synthetically generated forms within a training set may be similar to one another, but may have minor changes from form to form, to enable the weights of nodes within the neural network to be altered appropriately. Ordinarily skilled artisans can appreciate that the similarities between forms are sufficient to differentiate the training sets, or training pairs, from positive and negative samples, where a positive sample might resemble a target blank form, and a negative sample might resemble something different.

FIGS. 1A to 1H show various iterations and variations of an example of a synthetically generated blank form according to an embodiment.

FIG. 1A shows an example of a relatively plain synthetically generated blank form 100, with a title 102; a company logo 104; a header 110 near the top of the form; several subheaders 120, also near the top of the form, which are keywords; and several more keywords 130 near the bottom of the form. In this form 100, values will be positioned below the subheaders 120, and to the right of keywords 130

Figure 1B:

FIG. 1B shows an example of another relatively plain synthetically generated blank form 100', similar to FIG. 1A, except that the header 110' contains the word "Part" instead of the word "Widget"; one of the keywords 120' is "Amount" instead of "Total"; and an additional line for "Shipping" is included among the keywords 130'. All or fewer than all of these differences might appear in a form that is input along with the forms 100, 100' to determine differences in order to train the system. As with FIG. 1A, values will be located below keywords 120', and to the right of keywords 130'

FIG. 1C shows an example of the synthetically generated blank form 100 of FIG. 1A, with arrows indicating where possible values might appear either below or next to keywords. As part of the training of the blank form generation system, blank spaces, perhaps delineated with lines as in FIG. 1C, might denote spaces for values corresponding to their nearest keywords either above or to the left of the spaces. In an embodiment, part of the training of the system could include instruction that values appear in a limited number of orientations and/or locations relative to keywords in a form when the form is filled out. Thus, for example, looking at FIG. 1C, while there is a blank space immediately above the keyword "Subtotal" that is closer to that keyword than is the blank space to the right, the system can be trained to ignore the blank space right above "Subtotal" as part of the training to identify orientation of values relative to keywords.

Figure 1D:
Figure 1E:

FIG. 1D is a synthetically generated blank form similar to the form 100 in FIGS. 1A and 1C, except that there are additional keywords for "Color" and "Size," and additional blank spaces below. FIG. 1E is a synthetically generated blank form similar to the form in FIG. 1D, except that the keyword "Shipping" is added in a line near the bottom, and the keyword "Amount" occurs in place of the keyword "Total" at the far right.

Figure 1F:

FIG. 1F is a synthetically generated blank form similar to the form 100 in FIGS. 1A and 1C, except that in a few places, the headers or keywords are provided in cells of different colors or shades. In FIG. 1F, the header "Widget Order" has a relatively light gray shade. The line with the keywords "Widget," "Quantity," "Price," and "Total" has a slightly darker shade of gray. The keyword "Total" at the bottom has the darkest shade of gray in the blank form. The particular shades or their placement are not significant. FIG. 1F provides another example of a synthetically generated blank form that can be used to train the blank form generation system.

Figure 1G:

FIG. 1G is another synthetically generated blank form similar to the form 100 in FIGS. 1A and 1D, except that the shading is every other line, and not limited to lines having keywords in them. This kind of form can provide yet further training for the blank form generation system to recognize patterns in a form, helping the system learn, for example, that there are forms with shades and colors which do not automatically denote keyword locations.

Figure 1H:

FIG. 1H shows a form with the same keywords as in FIG. 1A, but with both differently colored (shaded) portions and different qualities or types of lines between adjacent cells, simulating the kinds of broken or intermittent lines that might appear in an image from which a blank form is to be generated.

The shadings and line qualities in FIGS. 1F to 1H can be considered to be examples of variations in actual images (as contrasted with synthetic images), along the lines of the artifacts mentioned above, including but not limited to blurs, irregular lines, irregular shading, scanner and/or camera noise, or other aspects of lossiness, geometric transformations, binarizations, or other irregularities that can result from taking an image of an existing form. In an embodiment, the identification of text, and the differentiation between keywords and values in that text, are a primary goal in training the system using pairs of synthetic images as training samples. While FIGS. 1F to 1H show certain fields with different shading, or different types of lines (or no lines at all), the purpose of these Figures is to exemplify artifacts, and to help the system learn to compensate for them. The presence or absence of shading or lines as a particular table format is not critical to the blank template form that ultimately is generated.

Generally, depending on the embodiment, different pairs of synthetic images taken from various ones of FIGS. 1A to 1H may be combined to form training samples.

Figure 2A:
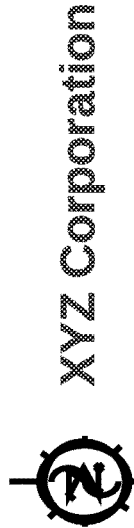
Figure 2B:
Figure 2D:
Figure 2E:
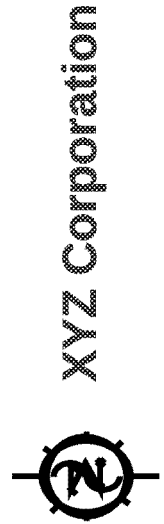
Figure 2F:

FIG. 2A shows a synthetic form similar to that of FIG. 1A, but including values. FIG. 2B is similar to FIG. 2A, but with fewer values. FIG. 2D is similar to FIG. 2A, but with an additional keyword "Shipping" near the bottom, similarly to what was discussed above with respect to FIGS. 1A-1H. FIG. 2E is similar to FIG. 2D, but with additional keywords "Color" and "Size" added. FIG. 2E also is similar to FIG. 1E, but with corresponding values added below the keywords. FIG. 2F is similar to FIG. 2E, but with fewer values.

Generally, depending on the embodiment, different pairs of synthetic images taken from various ones of FIGS. 2A to 2F may be combined to form training samples.

Also, depending on the embodiment, different pairs of synthetic images taken from various ones of FIGS. 2A to 2F and FIGS. 1A to 1H may be combined to form training samples. For example, a pair of synthetic images comprising FIG. 1A and FIG. 2A or FIG. 2B will provide a training set with the same keywords, but with empty value fields (FIG. 1A) and filled value fields (FIG. 2A having more filled value fields than FIG. 2B). As another example, a pair of synthetic images comprising FIG. 1D and FIG. 2E or FIG. 2F will provide another training set with the same keywords, but with empty value fields (FIG. 1D) and filled value fields (FIG. 2E having more filled value fields than FIG. 2F). In addition, in an embodiment, aspects of the artifacts exemplified in FIGS. 1F-1H may be included in any of FIGS. 2A to 2F.

Figure 3A:
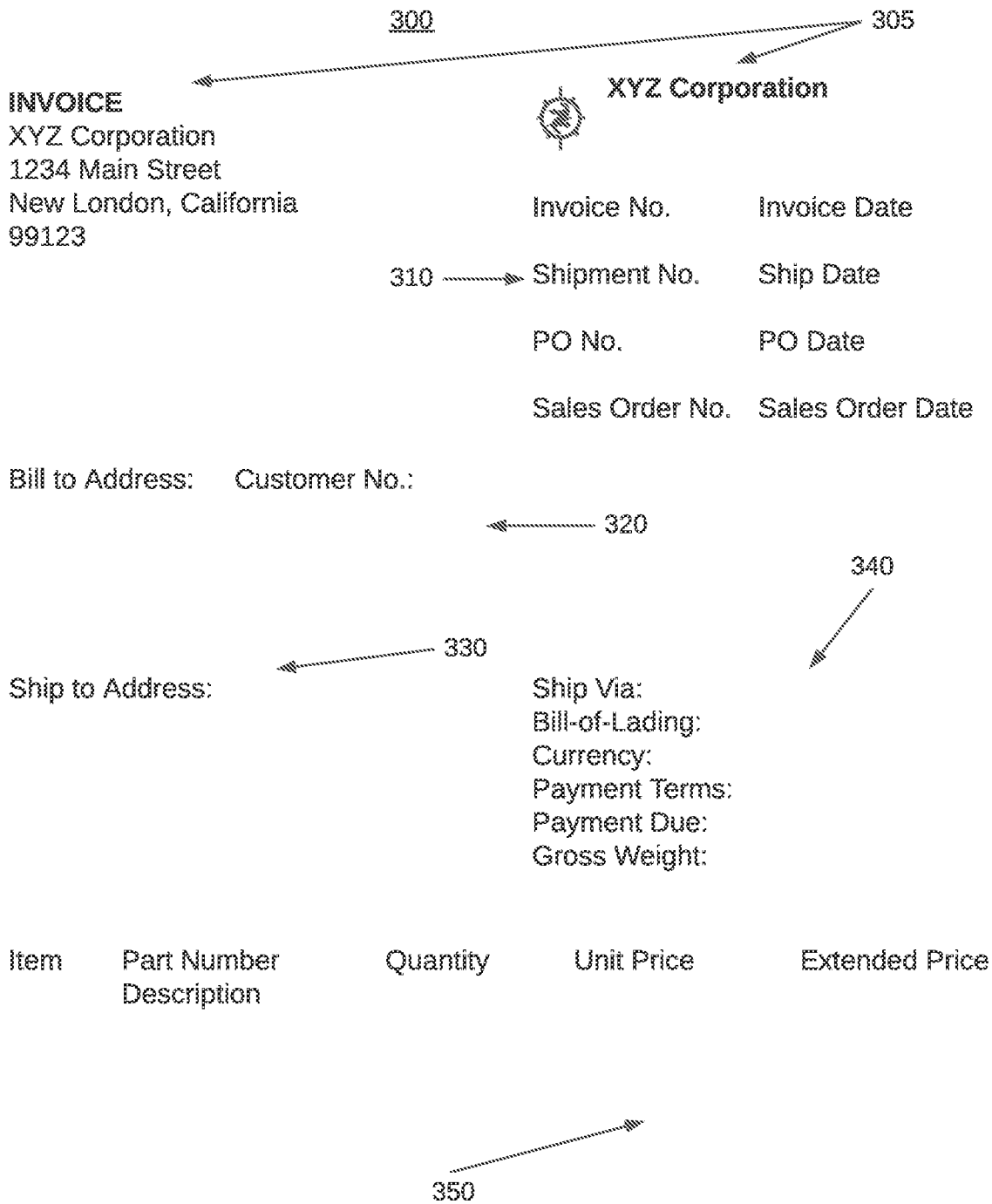
FIGS. 3A-3D show examples of a different kind of synthetically generated blank form and filled forms according to an embodiment.

FIG. 3A shows yet a different synthetic form, with different tabular combinations of keywords and possible values located throughout a particular form 300. In FIG. 3A, a header and logo 305 may be positioned at the top of the form. Various tables 310, 320, 330, 340, and 350 may be positioned at different locations on the form 300. In an embodiment, the formats of these tables may be such that combining the tables into a single table with keywords and values may be difficult to provide in terms of training a system. For example, locations of values relative to keywords may be different in the various tables, and may be formatted differently.

Figure 3B:
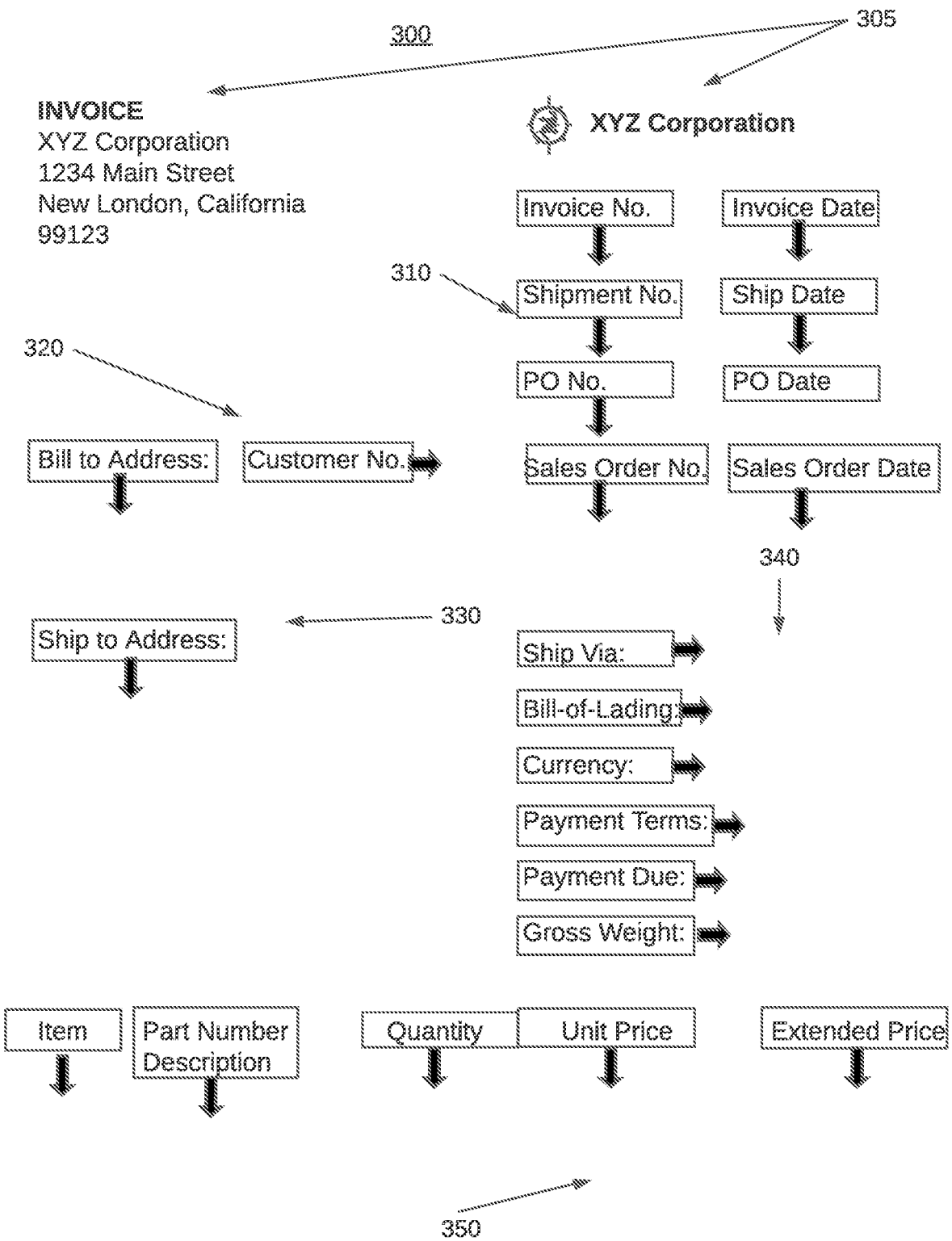

To highlight these keyword-value location differences, FIG. 3B, which is similar to FIG. 3A, provides arrows indicating the location of values relative to keywords. Looking for example at table 310, values are located beneath each keyword. There are four rows of keywords, and four rows of corresponding values. Table 340 also has multiple keywords, but there the values are located to the right of the respective keywords. There are six columns of keywords, and six columns of corresponding values.

Also in FIG. 3B, table 320 has a value below one keyword ("Bill to Address:"), and a value to the right of the other keyword ("Customer No."). The value under "Bill to Address:" may be multiple rows, as addresses are known to be formatted. The same may be true for the value under "Ship to Address:" Table 350 has values below respective keywords. The values may or may not occupy multiple rows.

Figure 3C:
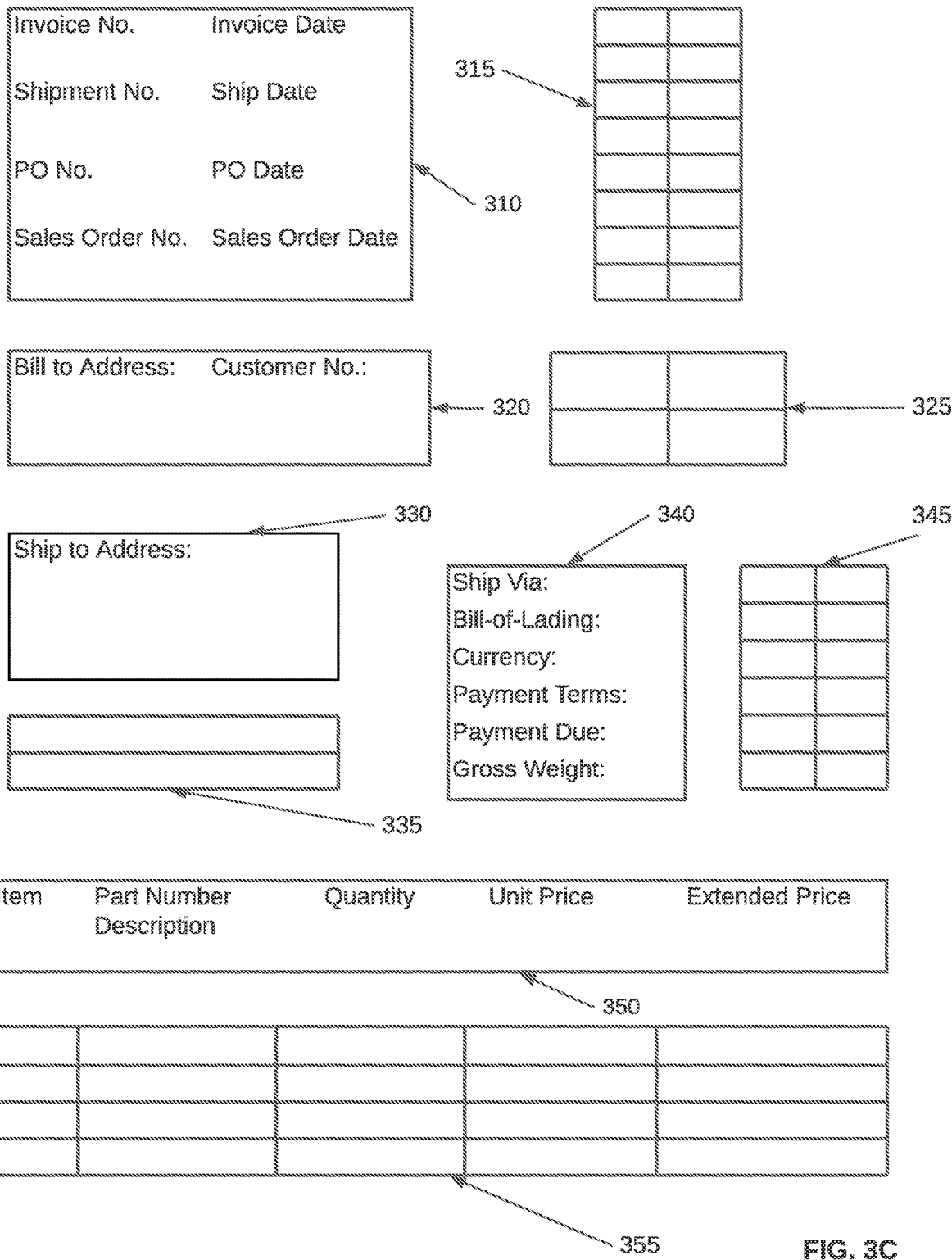

FIG. 3C has table 315 to the right of table 310; table 325 to the right of table 320; table 335 below table 330; table 345 to the right of table 340; and table 355 below table 350. Tables 315, 325, 335, 345, and 355 contain rows and columns for not only keywords, but also for values. In FIG. 3C, then, it is possible to see relative locations of values relative to keywords, similarly to FIG. 3B.

Figure 3D:
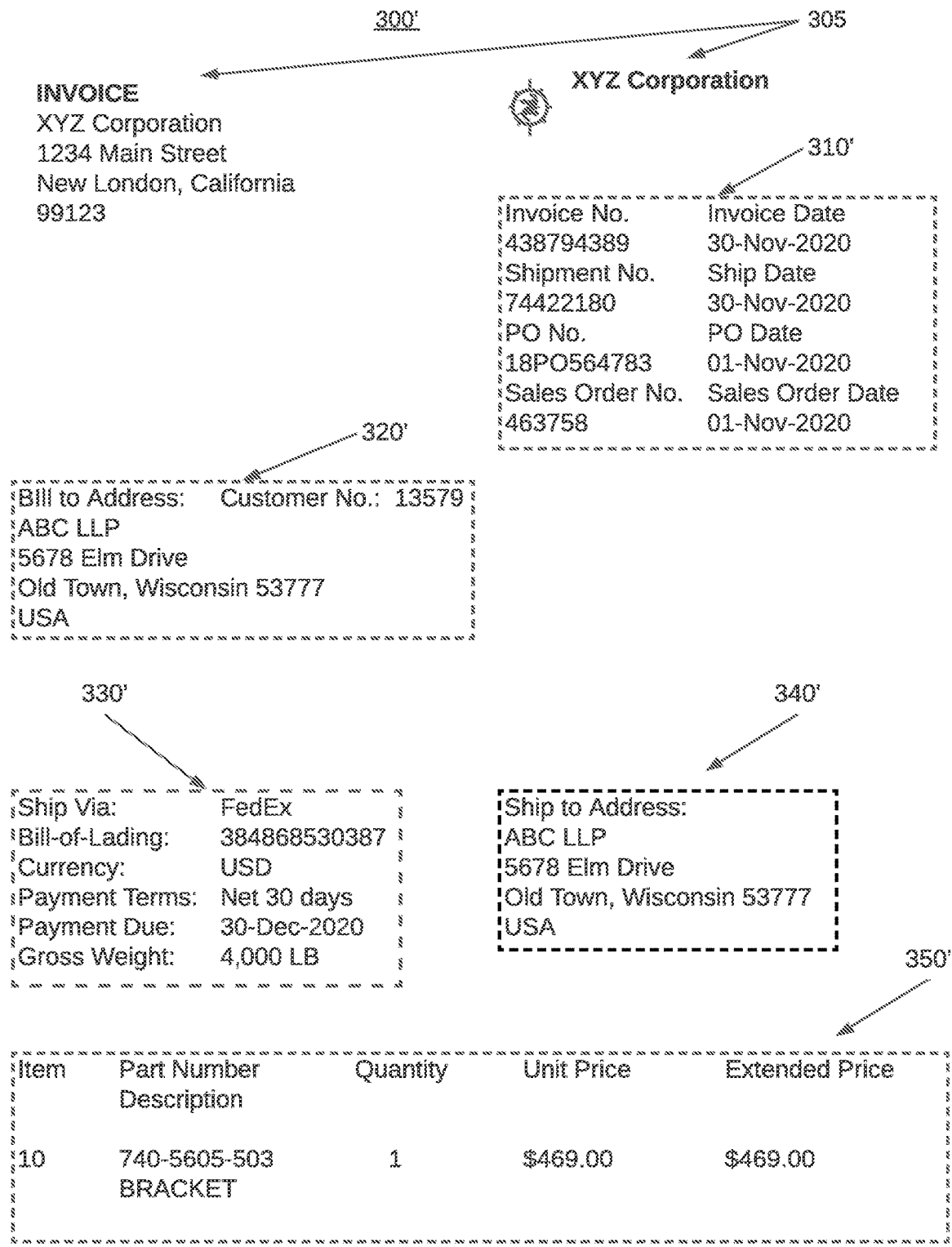

FIG. 3D is similar to FIG. 3B, but has values in each of the tables, in proper locations relative to keywords in those tables. Table 350, which has locations for parts to be ordered, may have multiple rows for multiple parts, similarly to what FIGS. 2A-2F show and describe. The remaining tables 310, 320, 330, and 340, while in some instances (e.g. tables 320 and 330) having a single "value" which may take up more than one row, still have a single value below a respective keyword.

In FIG. 3D, table 350 lists a single part. As noted, table 350 may list multiple parts. Also in FIG. 3D, addresses in tables 320 and 330 may take up different numbers of rows. As part of compiling training pairs using FIG. 3A and FIG. 3D, for example, there may be different types of addresses used in tables 320 and 330, and different numbers of parts provided in table 350.

The foregoing discussion provides specific examples of combinations of synthetic forms as training sample pairs, including samples with different numbers of particularly where the keywords are the same in content and number, and the number of values that are filled in vary. Ordinarily skilled artisans will appreciate that various combinations of samples in any of FIGS. 1A to 1H and FIGS. 2A to 2F can serve a training purpose.

Figure 4:
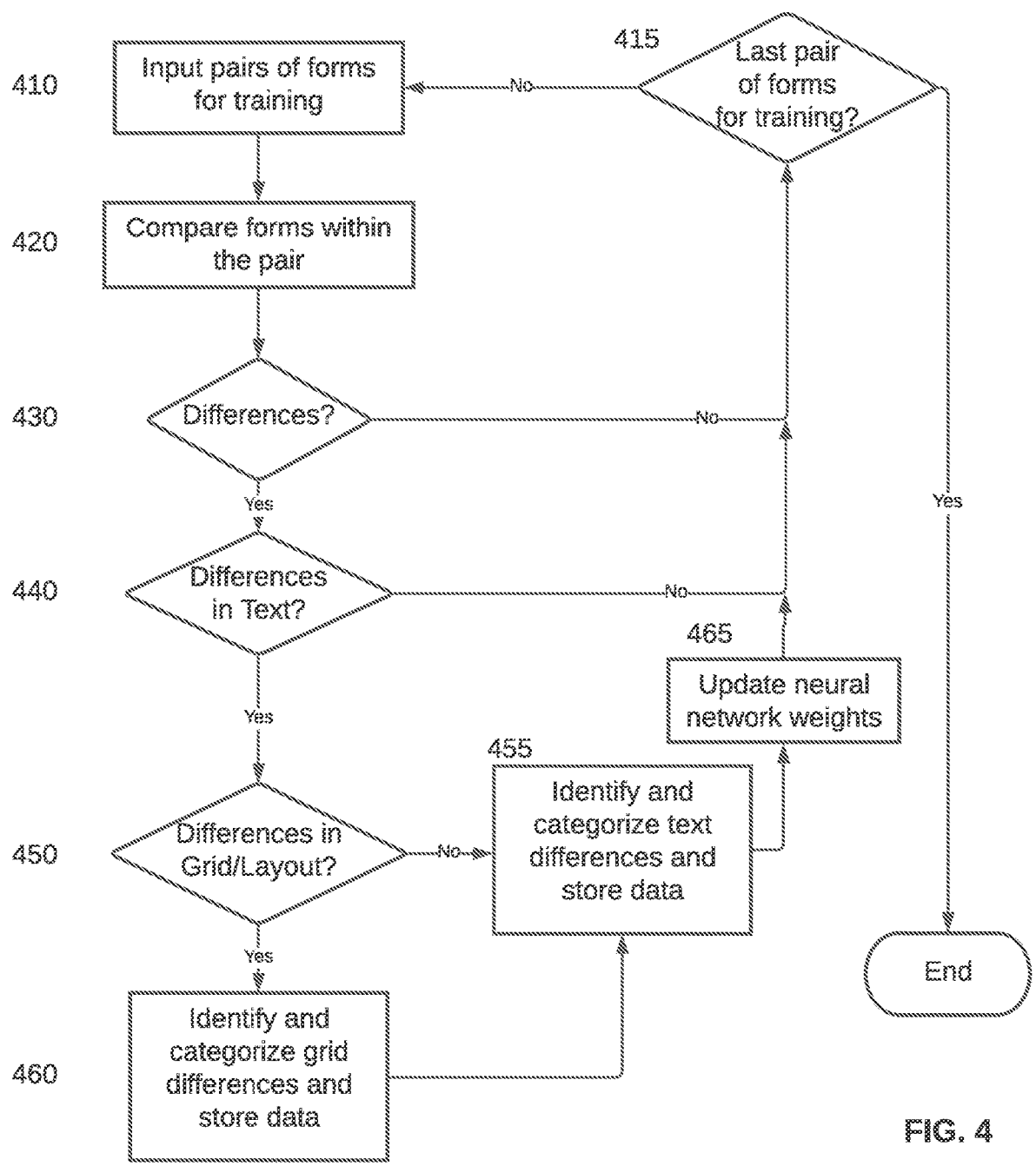
FIG. 4 is a high level flow chart depicting some operations in accordance with an embodiment.

FIG. 4 is a high level flow chart depicting operations for training the inventive system in accordance with one or more embodiments. Ordinarily skilled artisans will appreciate that FIG. 4 is not specific to blank forms or filled forms, and is not specific to synthetically generated forms or scanned or otherwise imaged forms.

At 410, the system receives an input pair of forms for training as a training sample. In an embodiment, the forms are similar to each other in relevant respects, but may have one or more differences between them related to one or more of format, coloring or shading, keywords, or values, as discussed above with respect to FIGS. 1A-1H, 2A-2F, and 3A-3D. In an embodiment, each form in the training sample may be blank, or may be filled. In an embodiment, where both forms are filled, the number of values for respective keywords may be the same or may be different. In an embodiment, one form in the training sample may be blank, and one may be filled.

At 420, the forms are compared to see if there are differences. At 430, if there are no differences, at 415 a next pair of forms for training may be identified for input. If there are no such pairs, the flow ends.

If there are differences between the forms in the pair, then at 440 it is determined whether there are differences in text. The differences could be among keywords, or values, or both, looking at any of FIGS. 1A-1H and 2A-2F, or FIGS. 3A and 3D, or even between different versions of FIG. 3D with different numbers of values in table 350, merely by way of example. Again, if there are no text differences, flow returns to look for a next pair of forms. If there are text differences, at 450 the respective grids or layouts of the pair of forms may be compared to see if there are differences. For example, there may be an additional row, as in the comparison of the forms of FIG. 1B or 2C with the forms of FIG. 1A or 2A, or in the comparison of different versions of FIG. 3D with different numbers of values in table 350.

At 460, if there are differences in the grids or layouts in the pair of forms (because of numbers of keywords, numbers of values, or other aspects of appearances such as color, lines, and/or shading), those differences are identified and categorized (e.g. keyword or value). In an embodiment, data relating to those differences may be stored. At 455, if there are differences in text, those differences are identified and categorized (e.g. keyword or value). At 465, weights for nodes in the neural network (whether for an input layer, an output layer, or one or more hidden layers) may be updated, and flow returned to process a next pair of forms for training.

While FIG. 4 shows grid differences being identified and categorized before text differences, ordinarily skilled artisans will appreciate that this sequence is not mandatory, but may be reversed. Also, as new forms are identified, periodic retraining using new and different synthetic images may be desired.

Figure 5:
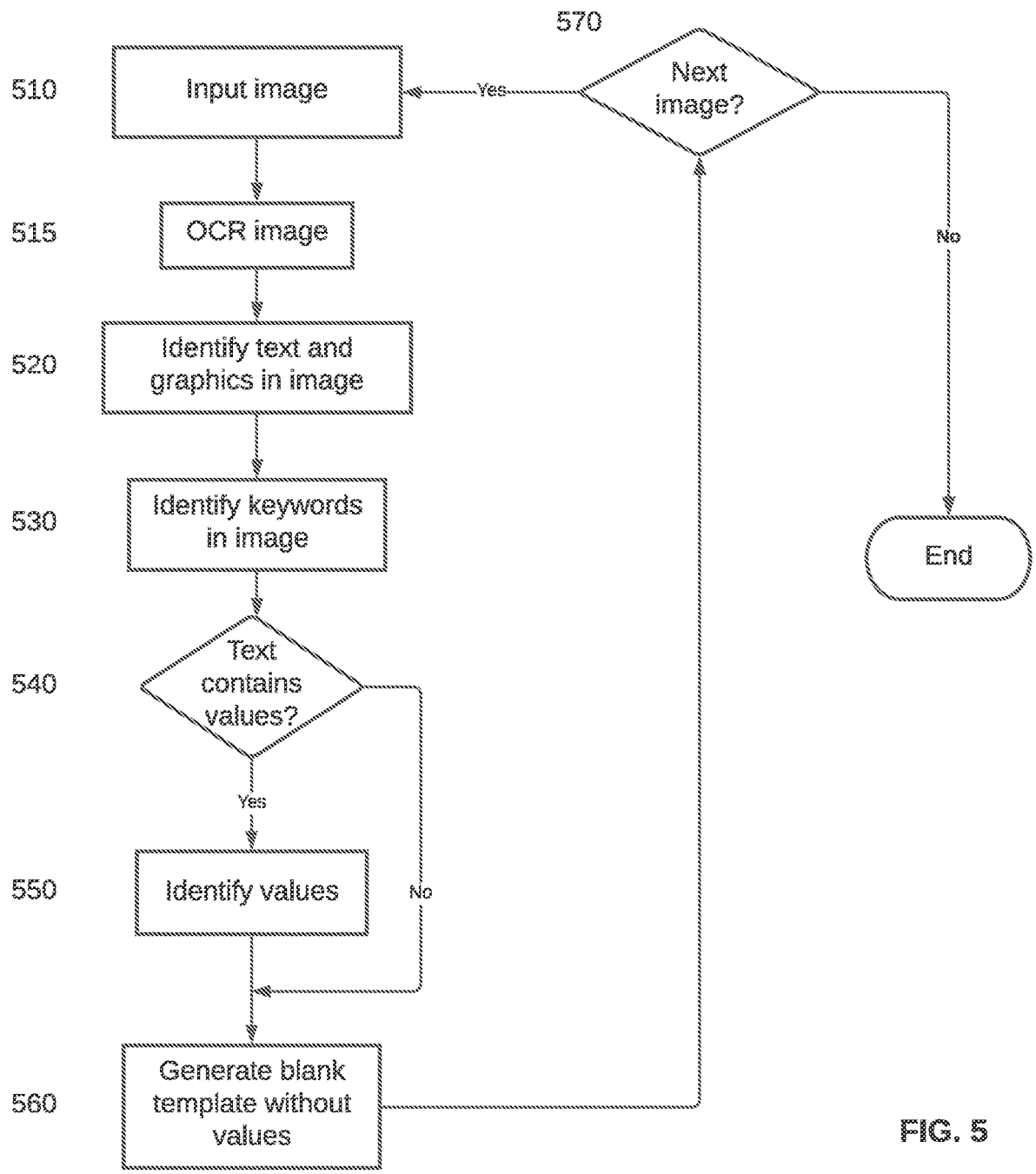
FIG. 5 is a high level flow chart depicting some operations in accordance with an embodiment.

FIG. 5 is a high level flow chart depicting a sequence of operations for generating a blank template from an input image form according to an embodiment. In FIG. 5, it is assumed that the system that generates the blank template from an input image form has been trained, for example, using the techniques described above with respect to FIG. 4. In FIG. 5, at 510 an image is input, for example, via a scanner or a camera. The image may be a blank, partly filled, or filled form, but is not synthetically generated, as is the case with the blank, partly filled, or filled forms discussed above with respect to training of the system.

In an embodiment, after the image is input, at 515 an optical character recognition (OCR) operation may be performed, and an OCR version of the image may be output. In an embodiment, the OCR operation is not performed at the beginning, but instead is performed later, but before a blank template is generated. Accordingly, the image referred to in 520 and 530 may or may not be an OCR version of the image. In an embodiment, the OCR operation may not be performed at all. If it is performed, in an embodiment the OCR function may provide spaces in the produced blank template that is generated, so that a user may input values, in the blank fields in the template.

At 520, text and graphics in the image may be identified. Some of the graphics may comprise headers, logos, colored or shaded areas, or table lines in various places, among other things. In an embodiment, the graphics (other than possibly table lines or headers or logos) may not be included in the blank template that is generated.

At 530, keywords in the image may be identified. As part of the training of the system, the system differentiates keywords from headers or logos. In the course of processing an input image to generate a blank template, the system identifies headers or logos for use in the blank template generation.

At 540, once keywords are identified, the image is reviewed to determine whether it contains values, looking for example at areas next to keywords (below or to the right) to see if there is any text. If there is no text, flow proceeds to 560. If there is text, then at 550 that text is identified as being one or more values.

At 560, a blank template is generated, with keywords but without values, and with tables identified appropriately, whether with lines, colors, shading, or some combination of the three, and including the suitable headers and/or logos identified earlier in the process. In an embodiment, the generated blank template may be editable by a user. In an embodiment, the user may be able to edit only the fields of the template where values are to be added, so that keywords can be left unchanged. In an embodiment, keywords also may be edited. At 570, if there is a next image from which a blank template is to be generated, flow will return to 510. Otherwise the operation will end.

Figure 6:
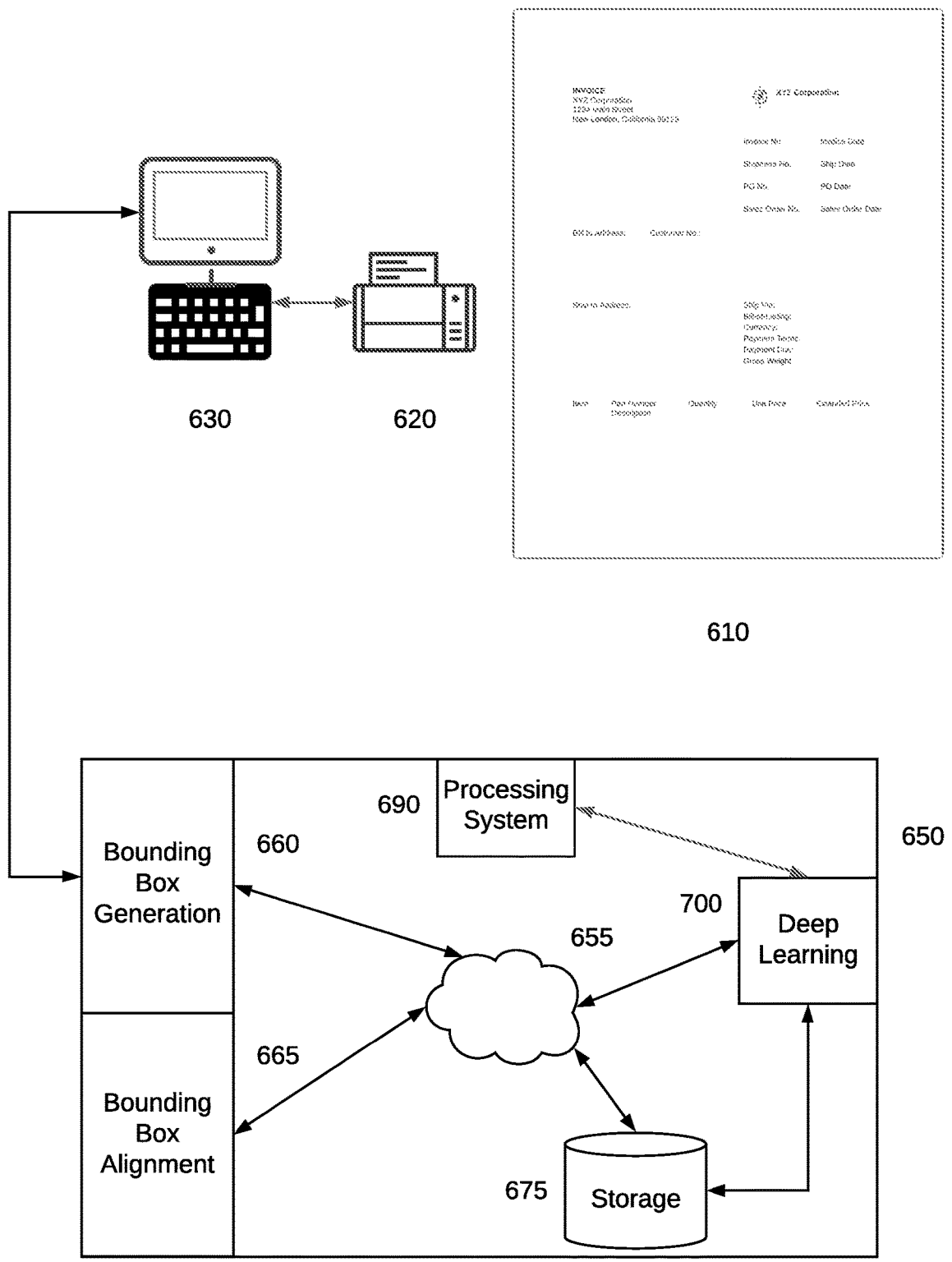
FIG. 6 is a high level block diagram of a system for implementing aspects of the invention according to embodiments.

FIG. 6 is a high level block diagram of a system to implement aspects of the method described herein according to one or more embodiments. In FIG. 6, computing apparatus may provide pairs of synthetically generated forms (blank, partly filled, or filled) to computing system 650. In an embodiment, after training, to generate a blank template in accordance with the above description with respect to FIG. 5, an input image from form 610 may be provided via scanner 620, which may be connected to computing system 650 either directly or through computing apparatus 630. In an embodiment, a camera may provide the input image. As discussed earlier, in an embodiment it is desirable for the inventive system to learn using synthetically generated forms, as the training can proceed more quickly and efficiently when there is more control over differences between and among pairs of input forms.

In training, computing system 650 will process input pairs of samples to identify differences. In an embodiment, difference identification may proceed as described above with respect to FIG. 4. Computing system 650 will include one or more processors, one or more storage devices, and one or more solid-state memory systems (which are different from the storage devices, and which may include both non-transitory and transitory memory). In an embodiment, computing system 650 may include deep learning system 700, which will be described in more detail below.

Where deep learning system 700 is involved, a training set may include blank, partly filled, or filled forms, from which the deep learning system can discern locations of keywords. Once deep learning system 700 is able to discern locations of keywords, different forms can be input, and deep learning system 700 will be able to discern keyword locations. As just noted, deep learning system 700 also may be trained on partly or completely filled-in forms, where keyword locations may be known. Where text is provided on the filled-in forms adjacent to keywords, the deep learning system 700 can be trained to recognize that text as values. Once the deep learning system 700 is trained, when different filled in forms are input, it then can be possible to discern locations of values associated with respective keywords, based on a location of values relative to a keyword (e.g. either immediately below, or immediately to the right of the keyword), to enable generation of blank templates without values, and with keywords and other text (other than values) and graphics in the appropriate location(s).

As part of the discernment of keyword and value location, computing system 650 may generate bounding boxes around text, using bounding box generation system 660. In a synthetically generated training form, it may be expected that text will be in predictable locations. Nevertheless, in an embodiment it may be desirable to generate the bounding boxes so that coordinates for location of keywords and values may be determined more accurately. Additionally, if images rather than synthetically generated training forms are used in training, irregularity in location of keywords and values may be more likely, making it more desirable to provide bounding boxes around the keywords and values.

In an embodiment, computing system 650 may include a bounding box alignment system 665 to align bounding boxes determined to be out of alignment. Where images are used in training, it may be expected that bounding boxes will be out of alignment, necessitating some corrective action to provide the alignment. In an embodiment, storage 675 may store the input the images or synthetically generated training forms that deep learning system 700 processes. Storage 675 also may store training sets, and/or the processed output of deep learning system 700, which may include identified keywords and value associated with particular input forms.

Computing system 650 may be in a single location, with network 655 enabling communication among the various elements in computing system 650. Additionally or alternatively, one or more portions of computing system 650 may be remote from other portions, in which case network 655 may signify a cloud system for communication. In an embodiment, even where the various elements are co-located, network 655 may be a cloud-based system.

Additionally or alternatively, processing system 690, which may contain one or more of the processors, storage systems, and memory systems referenced above, may implement the regression algorithms mentioned herein to resolve locations for keywords and corresponding value. In an embodiment, processing system 690 communicates with deep learning system 700 to assist, for example, with weighting of nodes in the system 700.

Figure 7:
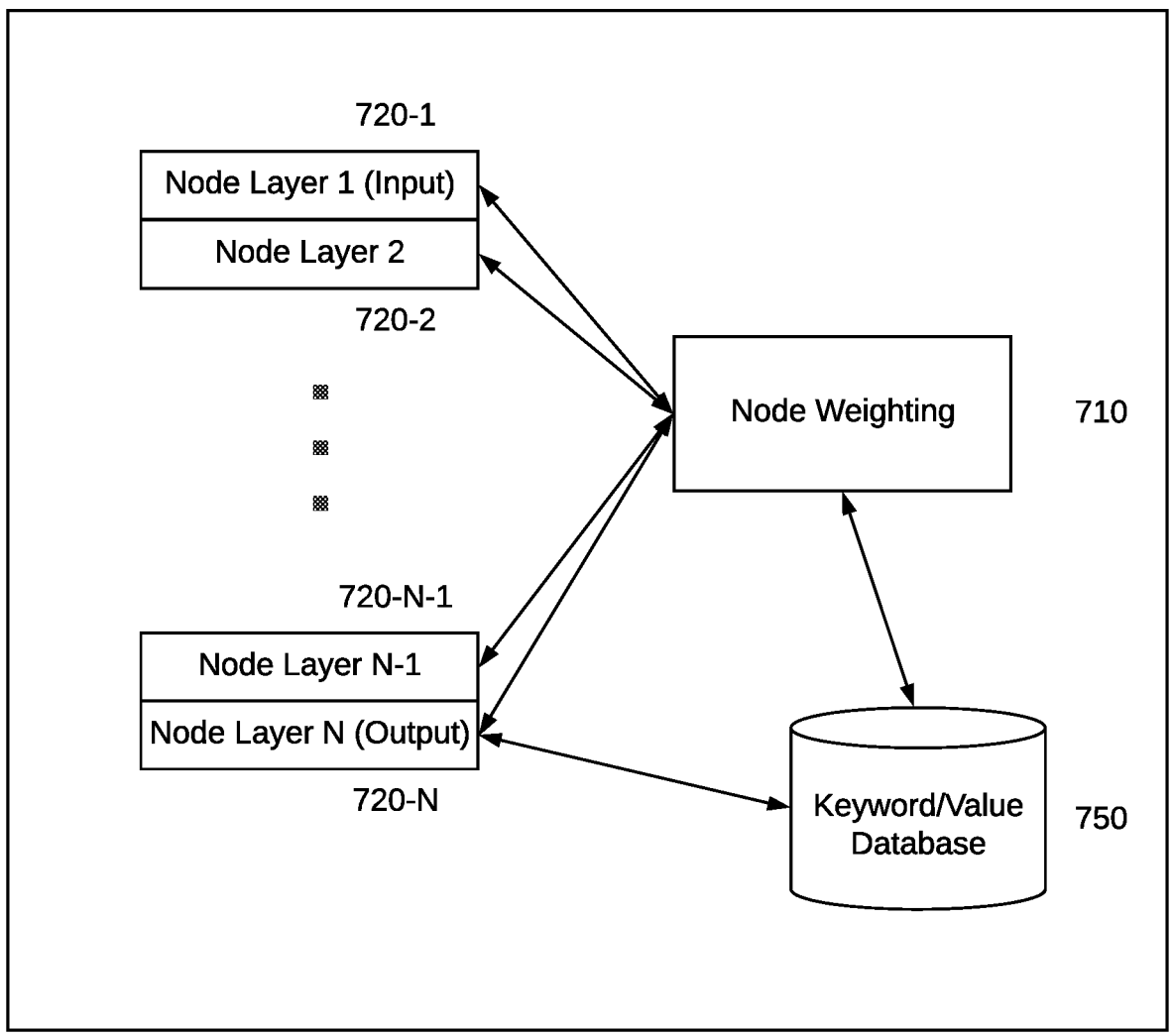
FIG. 7 is a high level block diagram of aspects of the system of FIG. 6.

FIG. 7 shows a slightly more detailed diagram of deep learning system 700. Generally, deep learning system 700 will have processor, storage, and memory structure that ordinarily skilled artisans will recognize. In an embodiment, the processor structure in deep learning system 700 may include graphics processing units (GPU) as well as or instead of central processing units (CPU), as there are instances in which neural networks run better and/or faster and/or more efficiently on one or more GPUs than on one or more CPUs. A neural network, such as a CNN or a DCNN, will have a plurality of nodes arranged in layers 720-1 to 720-N as depicted. Layer 720-1 will be an input layer, and layer 720-N will be an output layer. According to different embodiments, N can be two or greater. If N is three or greater, there will be at least one hidden layer (for example, layer 720-2). If N equals two, there will be no hidden layer.

There will be an initial weighting provided to the nodes in the neural network. The weighting is adjusted, as ordinarily skilled artisans will appreciate, as modifications are necessary to accommodate the different situations that a training set will present to the system. As the system 700 identifies keywords and value, the output layer 720-N may provide the keywords and value to a keyword/value database 750. The database 750 also may store classifications of forms, with accompanying location of keywords and, where applicable, location of value relative to the keywords.

In different embodiments, different ones of 410 to 465 in FIGS. 4 and 515 to 560 in FIG. 5 may be performed by different portions of the systems depicted in FIGS. 6 and 7, for example, by deep learning system 700, or by one or more processors in processing system 690, depending on the function to be performed and the resulting efficiency of dividing operations among different processors/GPUs/CPUs in the overall system.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A blank template form generation method comprising:
   responsive to an input of a pair of synthetically generated forms, using a deep learning model, comparing the forms to identify differences;
   using the deep learning model, responsive to identification of differences in text in the pair of synthetically generated forms, identifying text differences as keywords and values;
   using the deep learning model, responsive to identification of differences in graphics in the pair of synthetically generated forms, identifying graphics differences as one or more of form appearance and table appearance; and
   updating weights of nodes in the deep learning model responsive to one or more of the identifying text differences and the identifying graphics differences.

2. The blank template form generation method of claim 1, wherein the synthetically generated template forms are blank forms.

3. The blank template form generation method of claim 1, wherein the synthetically generated template forms are filled or partly filled.

4. The blank template form generation method of claim 1, further comprising providing the synthetically generated template forms with one or more artifacts that are characteristic of images.

5. The blank template form generation method of claim 4, wherein the artifacts are selected from the group consisting of variations in geometric transformations, lossy compressions, compression noise, binarizations, scanner noise, and camera noise.

6. The blank template form generation method of claim 1, further comprising receiving an input image and generating the blank template form from the input image.

7. The blank template form generation method of claim 6, wherein generating the blank template form from the input image comprises removing values identified in the input image.

8. The blank template form generation method of claim 7, wherein generating the blank template form from the input image comprises producing an editable form.

9. The blank template form generation method of claim 8, wherein producing an editable form comprises producing a form in which only fields containing values are editable.

10. The blank template form generation method of claim 1, wherein the deep learning system comprises a neural network selected from the group consisting of convolutional neural networks, deep convolutional neural networks, and fully convolutional neural networks.

11. A blank template form generation system comprising:
    one or more processors;
    one or more non-transitory memory devices; and a deep learning system which implements a deep learning model;

the blank template form generation system storing one or more programs in the one or more non-transitory memory devices, the one or more programs containing instructions which, when executed, perform the following:

responsive to an input of a pair of synthetically generated forms, using the deep learning model, comparing the forms to identify differences;

using the deep learning model, responsive to identification of differences in text in the pair of synthetically generated forms, identifying text differences as keywords and values;

using the deep learning model, responsive to identification of differences in graphics in the pair of synthetically generated forms, identifying graphics differences as one or more of form appearance and table appearance; and updating weights of nodes in the deep learning model responsive to one or more of the identifying text differences and the identifying graphics differences.

12. The blank template form generation system of claim 11, wherein the synthetically generated template forms are blank forms.

13. The blank template form generation system of claim 11, wherein the synthetically generated template forms are filled or partly filled.

14. The blank template form generation system of claim 11, further comprising providing the synthetically generated template forms with one or more artifacts that are characteristic of images.

15. The blank template form generation system of claim 14, wherein the artifacts are selected from the group consisting of variations in geometric transformations, lossy compressions, compression noise, binarizations, scanner noise, and camera noise.

16. The blank template form generation system of claim 11, further comprising receiving an input image and generating the blank template form from the input image.

17. The blank template form generation system of claim 16, wherein generating the blank template form from the input image comprises removing values identified in the input image.

18. The blank template form generation system of claim 17, wherein generating the blank template form from the input image comprises producing an editable form.

19. The blank template form generation system of claim 18, wherein producing an editable form comprises producing a form in which only fields containing values are editable.

20. The blank template form generation system of claim 11, wherein the deep learning system comprises a neural network selected from the group consisting of convolutional neural networks, deep convolutional neural networks, and fully convolutional neural networks.

* * * * *